(12) United States Patent
Matsuura et al.

(10) Patent No.: US 10,343,517 B2
(45) Date of Patent: Jul. 9, 2019

(54) INLET PIPE PERIPHERAL STRUCTURE

(71) Applicant: TOYOTA JIDOSHA KABUSHIKI KAISHA, Toyota-shi (JP)

(72) Inventors: Kenji Matsuura, Miyoshi (JP); Ryosuke Nomura, Nagoya (JP); Suguru Wakabayashi, Kawanishi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 739 days.

(21) Appl. No.: 14/913,133

(22) PCT Filed: Aug. 25, 2014

(86) PCT No.: PCT/IB2014/001613
§ 371 (c)(1),
(2) Date: Feb. 19, 2016

(87) PCT Pub. No.: WO2015/028863
PCT Pub. Date: Mar. 5, 2015

(65) Prior Publication Data
US 2016/0200190 A1 Jul. 14, 2016

(30) Foreign Application Priority Data
Aug. 27, 2013 (JP) .................................. 2013-175613

(51) Int. Cl.
*B60K 15/00* (2006.01)
*B60K 15/04* (2006.01)
*B60K 15/05* (2006.01)

(52) U.S. Cl.
CPC ...... *B60K 15/04* (2013.01); *B60K 2015/0474* (2013.01); *B60K 2015/0553* (2013.01)

(58) Field of Classification Search
CPC ............ B60K 15/04; B60K 2015/0474; B60K 2015/0553
(Continued)

(56) References Cited

U.S. PATENT DOCUMENTS 1,875,908 A * 9/1932 Zarobsky ................. A62C 4/00
                                                                220/86.1
4,079,952 A * 3/1978 Nishio .................... B60K 15/04
                                                                220/86.2
(Continued)

FOREIGN PATENT DOCUMENTS

DE         26 57 747 A1    6/1978
DE         198 05 715 A1   8/1998
(Continued)

OTHER PUBLICATIONS

International Search Report and Written Opinion dated Dec. 16, 2014 in PCT/IB2014/001613 filed on Aug. 25, 2014.

*Primary Examiner* — Ernesto A Grano
(74) *Attorney, Agent, or Firm* — Oblon, McClelland, Maier & Neustadt, L.L.P.

(57) ABSTRACT

A plate-shaped reinforcing member is joined to an outer peripheral portion of a first through-hole of a wheel house outer panel. This reinforcing member has a second through-hole formed in a position overlapping with the first through-hole of the wheel house outer panel. Also, a bent end portion that is formed bent is provided along an entire periphery of a peripheral edge portion of the second through-hole of the reinforcing member.

6 Claims, 4 Drawing Sheets

(58) Field of Classification Search
 USPC .......................................................... 220/86.2
 See application file for complete search history.

(56) References Cited

U.S. PATENT DOCUMENTS

| | | | | |
|---|---|---|---|---|
| 4,142,756 A | * | 3/1979 | Henning | B60K 15/0406 220/288 |
| 4,573,694 A | | 3/1986 | Goto et al. | |
| 6,033,006 A | * | 3/2000 | Bovellan | B60K 15/04 220/86.2 |
| 7,677,631 B1 | * | 3/2010 | Zischke | B60K 15/05 180/69.24 |
| 8,162,375 B2 | * | 4/2012 | Gurtatowski | B60K 15/05 296/97.22 |
| 8,490,661 B1 | * | 7/2013 | Leipold | B60K 15/04 141/312 |
| 8,899,285 B2 | * | 12/2014 | Hagano | B60K 15/04 141/350 |
| 9,022,053 B2 | * | 5/2015 | Doble | B60K 15/04 137/15.09 |
| 2002/0190065 A1 | * | 12/2002 | Yoshida | B60K 15/04 220/86.2 |
| 2007/0056654 A1 | * | 3/2007 | Poley | B60K 15/04 141/369 |
| 2010/0288762 A1 | * | 11/2010 | Muto | B60K 15/04 220/86.2 |
| 2010/0288763 A1 | * | 11/2010 | Muto | B62J 35/00 220/86.2 |

FOREIGN PATENT DOCUMENTS

| | | |
|---|---|---|
| JP | 63-82824 A | 4/1988 |
| JP | 2-142320 U | 12/1990 |
| JP | 2008-254584 A | 10/2008 |

\* cited by examiner

INLET PIPE PERIPHERAL STRUCTURE

BACKGROUND OF THE INVENTION

1. Field of the Invention

The invention relates to an inlet pipe peripheral structure.

2. Description of Related Art

Japanese Patent Application Publication No. 2008-254584 (JP 2008-254584 A), for example, describes a structure in which an inlet pipe is arranged to a vehicle width direction inside of a fuel filler opening of a vehicle. In such a structure, the inlet pipe is inserted through a through-hole of a wheel house outer panel. Therefore, the inlet pipe may interfere with a surrounding portion of the through-hole of the wheel house outer panel, when the inlet pipe is being assembled.

However, the plate thickness of the wheel house outer panel is thin, so the surrounding portion of the through-hole of the wheel house outer panel may deform due to interference by the inlet pipe.

SUMMARY OF THE INVENTION

The invention thus provides an inlet pipe peripheral structure capable of suppressing deformation of the surrounding portion of a through-hole of a wheel house outer panel, even if an inlet pipe interferes with the surrounding portion of the through-hole of the wheel house outer panel when the inlet pipe is assembled.

A first aspect of the invention relates to an inlet pipe peripheral structure that includes a wheel house outer panel in which a first through-hole for inlet pipe insertion is formed; a plate-shaped reinforcing member that is joined to an outer peripheral portion of the first through-hole of the wheel house outer panel, and in which a second through-hole for inlet pipe insertion is formed in a position overlapping with the first through-hole; and a bent end portion that is formed bent along an entire periphery of a peripheral edge portion of at least one of the second through-hole of the reinforcing member and the first through-hole of the wheel house outer panel.

According to this structure, a first through-hole for inlet pipe insertion is formed in the wheel house outer panel. Also, a plate-shaped reinforcing member is joined an outer peripheral portion of the first through-hole of the wheel house outer panel. This reinforcing member has a second through-hole for inlet pipe insertion formed in a portion that overlaps with the first through-hole. Therefore, the surrounding portion of the first through-hole of the wheel house outer panel is reinforced by the reinforcing member. Furthermore, the bent end portion that is formed bent is provided along the entire periphery of the peripheral edge portion of at least one of the second through-hole of the reinforcing member and the first through-hole of the wheel house outer panel. As a result, the rigidity of at least one of the peripheral edge portions is able to be increased. Thus, even if a load is input to the surrounding portion of the first through-hole of the wheel house outer panel, the surrounding portion of the first through-hole of the wheel house outer panel will not easily deform.

As described above, the inlet pipe peripheral structure according to the first aspect of the invention has the beneficial effect in which, even if the inlet pipe interferes with the surrounding portion of the through-hole of the wheel house outer panel when the inlet pipe is being assembled, deformation of the surrounding portion of the through-hole of the wheel house outer panel is able to be suppressed.

The inlet pipe peripheral structure may also have a reinforcing flange portion that is formed bent provided along an entire periphery of an outer peripheral portion of the reinforcing member.

According to this structure, a reinforcing flange portion that is formed bent is provided along the entire periphery of the outer peripheral portion of the reinforcing member, so the surface rigidity of the reinforcing member is increased. That is, even if a load in a direction in the through-direction of the second through-hole is input to the reinforcing member, the reinforcing member will not easily deform.

With this inlet pipe peripheral structure, the surface rigidity of the reinforcing member is increased, so this inlet pipe peripheral structure has the beneficial effect in which the surface rigidity of the surrounding portion of the through-hole of the wheel house outer panel is able to be increased even more.

In the inlet pipe peripheral structure described above, the wheel house outer panel may include a first curved portion that is curved toward a vehicle width direction inside from an upper end side wall where the first through-hole is formed toward an upper end edge portion. Also, the reinforcing member may be arranged to a vehicle width direction outside of the wheel house outer panel, and may include a reinforcing main body that is in surface contact with, and joined to, the upper end side wall of the wheel house outer panel. The reinforcing flange portion of the reinforcing member may extend from an outer peripheral end of the reinforcing main body via a second curved portion that is curved to a side opposite a side with the wheel house outer panel, and a portion in a circumferential direction of the second curved portion of the reinforcing member may be arranged adjacent to the first curved portion of the wheel house outer panel.

According to this structure, the first curved portion of the wheel house outer panel is a curved portion that is curved toward the vehicle width direction inside from an upper end side wall where the first through-hole is formed toward the upper end edge portion. Also, the reinforcing member is arranged to the vehicle width direction outside of this wheel house outer panel, and the reinforcing main body of the reinforcing member is in surface contact with, and joined to, the upper end side wall of the wheel house outer panel. Here, the reinforcing flange portion of the reinforcing member extends from the outer peripheral end of the reinforcing main body via the second curved portion that is curved toward the side opposite the side with the wheel house outer panel. A portion in the circumferential direction of the second curved portion of the reinforcing member is arranged adjacent to the first curved portion of the wheel house outer panel. Therefore, if a load from the vehicle width direction outside is input to the reinforcing member, the load is able to be transmitted from the portion in the circumferential direction of the second curved portion of the reinforcing member to the first curved portion of the wheel house outer panel. Also, the first curved portion has greater rigidity than the upper end side wall with respect to a load from the vehicle width direction outside, so the wheel house outer panel will not deform as easily as it would if a load was transmitted from the entire periphery of the second curved portion of the reinforcing member to the upper end side wall of the wheel house outer panel.

With the inlet pipe peripheral structure described above, if the inlet pipe interferes with the surrounding portion of the through-hole of the wheel house outer panel, the load is transmitted from a portion in the circumferential direction of the second curved portion of the reinforcing member to the first curved portion of the wheel house outer panel, so this inlet pipe peripheral structure has the beneficial effect in which deformation of the wheel house outer panel is able to be effectively suppressed.

In the inlet pipe peripheral structure described above, a cylindrical shield that is inserted through both the first through-hole and the second through-hole, and that surrounds a portion of an inlet pipe may be arranged. Also, a flanged portion that protrudes toward a radially outer side of the shield and abuts along an entire periphery against a surface on a vehicle width direction inside of an overlapping portion of the reinforcing member and the wheel house outer panel may be formed on the shield, and an urging member that urges the flanged portion toward the radially outer side of the shield may be provided on the shield. Further, the bent end portion may be formed bent toward the vehicle width direction outside along the entire periphery of at least one of the peripheral edge portions, and an engaging portion that forms a portion of the shield may be engaged with a tip end of the bent end portion.

According to this structure, a cylindrical shield is inserted through both the first through-hole and the second through-hole, and surrounds a portion of an inlet pipe. A flanged portion formed on the shield protrudes toward a radially outer side of the shield and abuts along an entire periphery against the surface on the vehicle width direction inside of the overlapping portion of the reinforcing member and the wheel house outer panel, and is urged toward the radially outer side of the shield by an urging member. Meanwhile, the bent end portion is formed bent toward the vehicle width direction outside along the entire periphery of at least one of the peripheral edge portions, and an engaging portion that forms a portion of the shield is engaged with the tip end of the bent end portion. Therefore, even if the bent end portion is formed on the reinforcing member, the shield is able to be stably retained on the peripheral edge portion side of the first through-hole and the second through-hole by a simple structure.

This inlet pipe peripheral structure has the beneficial effect in which sealability by the shield is able be improved by a simple structure, even if a bent end portion is formed on the reinforcing member.

In the inlet pipe peripheral structure described above, a bent end portion that is formed bent toward the vehicle width direction outside may be provided along the entire periphery of the peripheral edge portion of the second through-hole of the reinforcing member.

In the inlet pipe peripheral structure described above, a bent back end portion that serves as a bent end portion may be formed bent toward the vehicle width direction outside along the entire periphery of the peripheral edge portion of the second through-hole of the reinforcing member, and the bent back end portion may be bent back toward a side with the reinforcing main body and overlap with the reinforcing main body.

In the inlet pipe peripheral structure described above, a bent end portion that is formed bent toward the vehicle width direction outside may be provided on the entire periphery of the peripheral edge portion of the first through-hole of the wheel house outer panel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
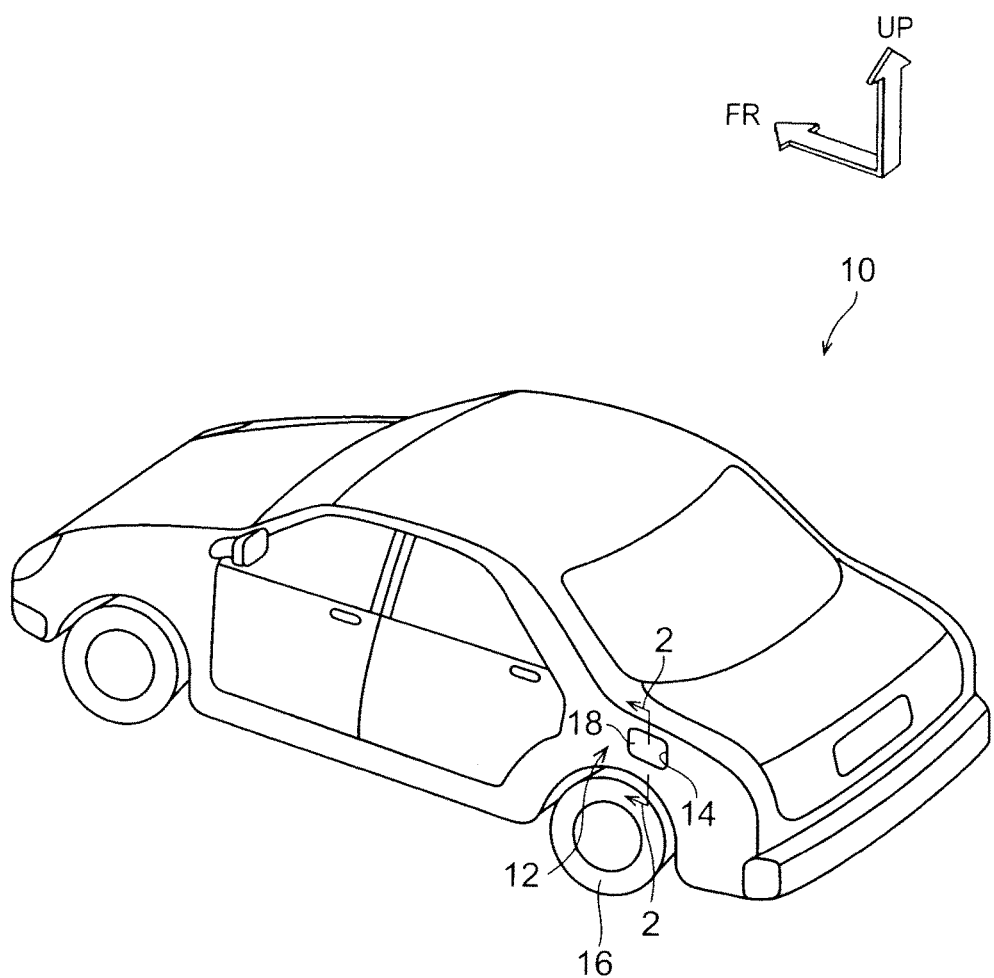
FIG. 1 is a perspective view schematically showing a vehicle to which an inlet pipe peripheral structure according to a first example embodiment of the invention has been applied.

An inlet pipe peripheral, structure according to a first example embodiment of the invention will be described with reference to FIGS. 1 to 3. In the drawings, arrow FR indicates a vehicle front side, arrow UP indicates a vehicle upper side, and arrow IN indicates a vehicle width direction inside.

FIG. 1 is a perspective view schematically showing a vehicle 10 to which the inlet pipe peripheral structure according to this example embodiment has been applied. Also, FIG. 2 is an enlarged sectional view taken along line 2-2 in FIG. 1, and FIG. 3 is a perspective view of a portion of the inlet pipe peripheral structure according to the first example embodiment of the invention viewed from a vehicle width direction outside.

As shown in FIG. 1, the vehicle 10 includes a side member outer panel 12 that forms a vehicle outer panel. A fuel filler opening 14 is formed to an upper side of a rear wheel 16, and a fuel lid 18 that opens and closes this fuel filler opening 14 is provided.

Figure 2:
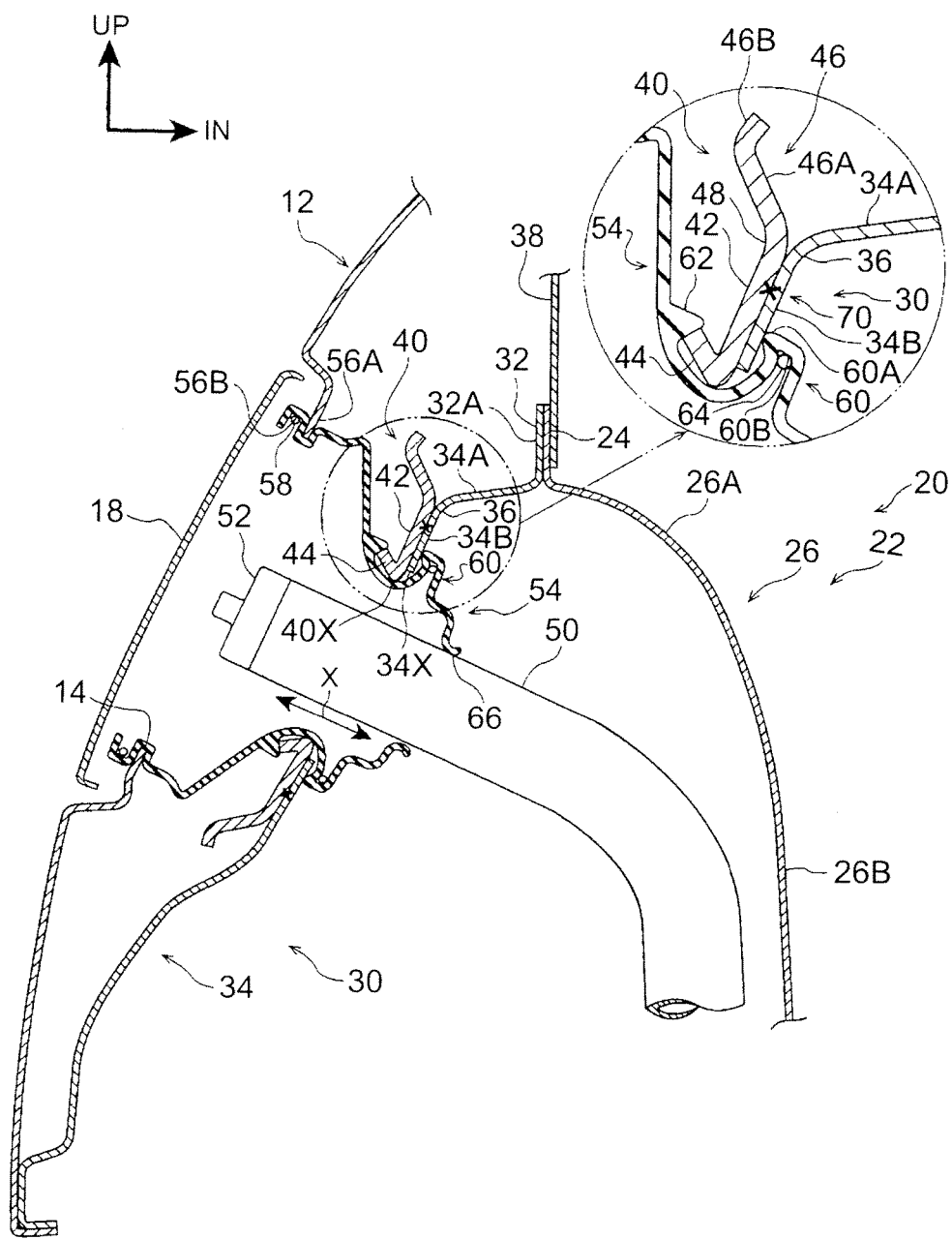
FIG. 2 is an enlarged sectional view taken along line 2-2 in FIG. 1.

As shown in FIG. 2, an upper portion of a rear wheel house 20 is arranged to a vehicle width direction inside of the fuel filler opening 14. This rear wheel house 20 is a member that covers the upper side of the rear wheel 16 (see FIG. 1). A portion on the vehicle width direction inside of the rear wheel house 20 is formed by a wheel house inner panel 22. In contrast, a portion on the vehicle width direction outside of the rear wheel house 20 is formed by a wheel house outer panel 30. The wheel house inner panel 22 and the wheel house outer panel 30 are press formed articles formed from steel sheet. An undercoat layer may be formed on surfaces of the wheel house inner panel 22 and the wheel house outer panel 30 that face the rear wheel 16 (see FIG. 1).

A portion that extends from a front end to a rear end via an upper end of the wheel house inner panel 22 is formed by a flange portion 24 having a generally inverted U-shape in a vehicle side view. Similarly, a portion that extends from a front end to a rear end via an upper end of the wheel house outer panel 30 is formed by a flange portion 32 having a generally inverted U-shape in a vehicle side view (see FIG. 3). The flange portion 24 of the wheel house inner panel 22 and the flange portion 32 of the wheel house outer panel 30 are joined together by spot welding. Also, a roof side inner panel 38 is arranged to an upper side of the rear wheel house 20. A lower end portion of this roof side inner panel 38 is joined to the flange portion 24 of the wheel house inner panel 22 and the flange portion 32 of the wheel house outer panel 30.

A main body portion 26 of the wheel house inner panel 22 bulges toward the vehicle width direction inside with respect to the flange portion 24. Also, the main body portion 26 of the wheel house inner panel 22 has an inside cover portion 26A that is continuous with the flange portion 24 and has a curved shape in the longitudinal sectional view of FIG. 2, and a vertical wall portion 26B that is continuous with the inside cover portion 26A and has a vertical wall shape in the longitudinal sectional view of FIG. 2. The inside cover portion 26A has a generally arc strip shape in a vehicle side view, and the vertical wall portion 26B has a generally semicircular shape in a vehicle side view.

In contrast, a main body portion 34 of the wheel house outer panel 30 bulges out toward the vehicle width direction outside with respect to the flange portion 32. As shown in FIG. 3, the main body portion 34 of the wheel house outer panel 30 has a first outside cover portion 34A that is continuous with the flange portion 32 and has a generally inverted U-shape, and an upper end side wall 34B and a second outside cover portion 34C, both of which are continuous with a vehicle width direction outside end of the first outside cover portion 34A. The upper end side wall 34B is formed in a vertical wall shape and is provided on an upper end portion of the main body portion 34 of the wheel house outer panel 30. Also, the second outside cover portion 34C is continuous with a lower end portion of the upper end side wall 34B and is formed in an arch shape in a vehicle side view, as well as a curved shape that bulges upward at an angle toward the vehicle width direction outside in a cross sectional view in FIG. 2.

A first curved portion 36 that is curved toward the vehicle width direction inside from the upper end side wall 34B toward an upper end edge portion 32A (an arch-shaped portion on the upper end side of the flange portion 32) is formed on an upper end portion of the wheel house outer panel 30 structured in this way. As shown in FIG. 3, an edge line of the first curved portion 36 forms a boundary line between the upper end side wall 34B and the first outside cover portion 34A, and has a semielliptical shape that is long in a vehicle longitudinal direction.

As shown in FIG. 2, a first through-hole 34X for inserting an inlet pipe 50 is formed in the upper end side wall 34B of the wheel house outer panel 30. The inlet pipe 50 is connected to a fuel tank, not shown, and an upper end opening of the inlet pipe 50 is directed toward the side with the fuel filler opening 14 of the side member outer panel 12. Also, a fuel cap 52 is attached to the upper end opening of the inlet pipe 50. The upper end opening of the inlet pipe 50 is normally closed off by the fuel cap 52, and is opened by removing the fuel cap 52 when fueling.

A plate-shaped reinforcing member 40 arranged to the vehicle width direction outside of the wheel house outer panel 30 is joined to an outer peripheral portion of the first through-hole 34X of the wheel house outer panel 30. The reinforcing member 40 is formed by a metal sheet (steel sheet as one example in this example embodiment) that is thicker than the wheel house outer panel 30. As shown in FIGS. 2 and 3, the reinforcing member 40 is formed in a ring shape, and has a second through-hole 40X for inserting the inlet pipe 50 (see FIG. 2) formed in a position overlapping with the first through-hole 34X. The second through-hole 40X of the reinforcing member 40 is arranged coaxially with the first through-hole 34X of the wheel house outer panel 30, and is set to have a slightly smaller diameter than the diameter of the first through-hole 34X of the wheel house outer panel 30. Also, a ring-shaped reinforcing main body 42 that forms an outer peripheral portion of the second through-hole 40X of the reinforcing member 40 is in surface contact with the upper end side wall 34B of the wheel house outer panel 30 and is joined thereto by spot welding (the spot is indicated by an "x"). As shown in FIG. 2, the second through-hole 40X of the reinforcing member 40 and the fuel cap 52 are separated from each other by a predetermined distance in the through-direction of the second through-hole 40X (i.e., the direction of arrow X).

Figure 3:
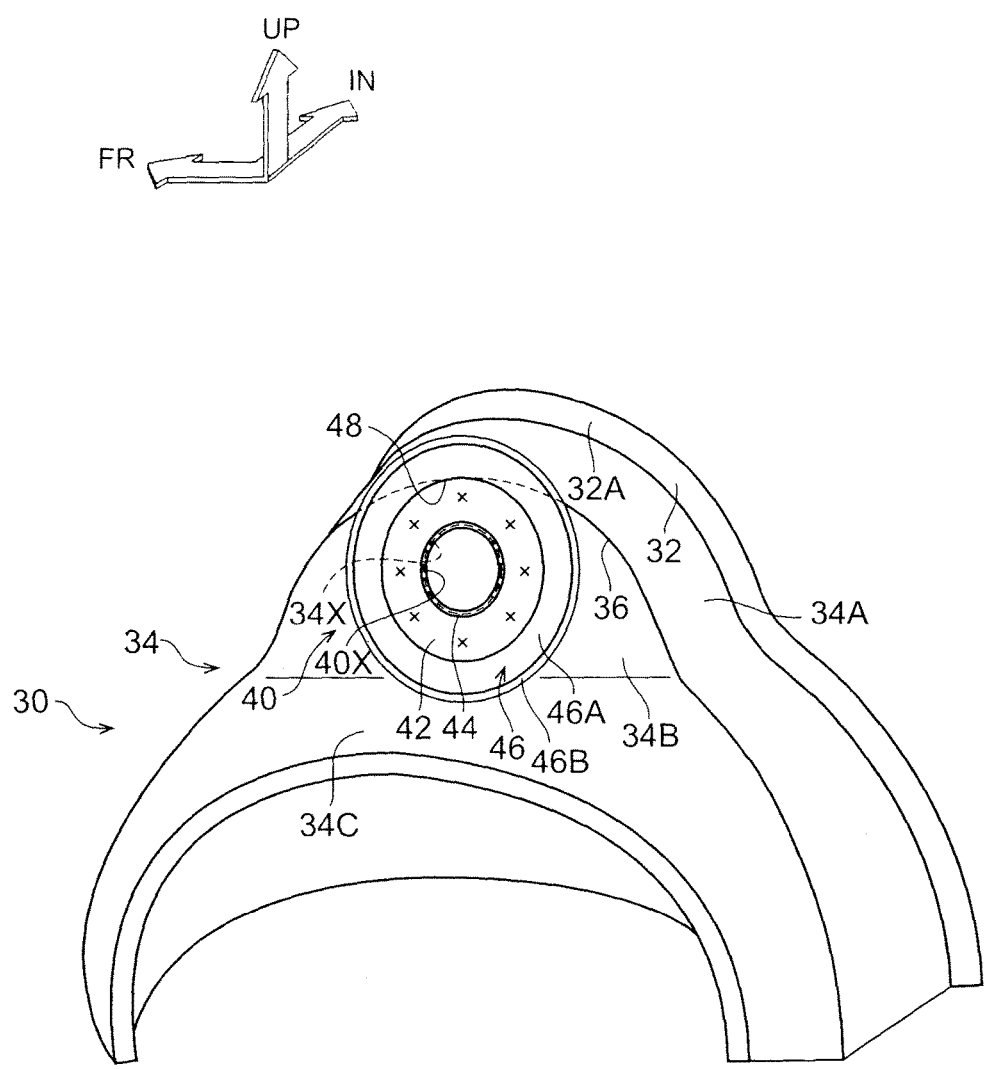
FIG. 3 is a perspective view of a portion of the inlet pipe peripheral structure according to the first example embodiment of the invention viewed from a vehicle width direction outside.

As shown in FIGS. 2 and 3, a bent end portion 44 formed bent toward the vehicle width direction outside is provided along the entire periphery of a peripheral edge portion of the second through-hole 40X of the reinforcing member 40. The bent end portion 44 is formed in a generally circular shape (a generally burring shape) by a bending process including burring, and in this example embodiment, the bent end portion 44 is inclined in a direction in which it becomes larger in diameter toward a tip end side, and opposing surfaces are symmetrically inclined.

Also, a reinforcing flange portion 46 that is formed bent is provided along the entire periphery of an outer peripheral portion of the reinforcing member 40. As shown in the partial enlarged view of FIG. 2, the reinforcing flange portion 46 extends out from an outer peripheral end of the reinforcing main body 42 via a second curved portion 48 that is curved toward the side opposite the side with the wheel house outer panel 30. A portion in the circumferential direction of the second curved portion 48 of the reinforcing member 40 is arranged adjacent to the first curved portion 36 of the wheel house outer panel 30.

As shown both in the partial enlarged view of FIG. 2 and in FIG. 3, the reinforcing flange portion 46 includes a ring-shaped inclined flange 46A that is curved from an outer peripheral end of the reinforcing main body 42 and is substantially parallel to the bent end portion 44, and a ring-shaped flat plate flange 46B that is curved from an outer peripheral end of the inclined flange 46A and is substantially parallel to the reinforcing main body 42. The extending length of the flat plate flange 46B is set shorter than the extending length of the inclined flange 46A.

Meanwhile, a cylindrical shield 54 is arranged on an outer peripheral side of an upper end portion of the inlet pipe 50, as shown in FIG. 2. This shield 54 is arranged with a direction in which it is slightly inclined on the vehicle lower side toward the vehicle width direction inside as the axial direction, and is inserted through both the first through-hole 34X and the second through-hole 40X, surrounding an upper end portion (a portion) of the inlet pipe 50. Also, the shield 54 is made of rubber and has elasticity in this example embodiment.

A fitting groove 56A is formed along the entire periphery of a portion on a radially outer side, of an open end portion on the vehicle width direction outside of the shield 54. The fitting groove 56A of the shield 54 fits into the open end of the fuel filler opening 14 of the side member outer panel 12. Also, a ring groove 56B is formed along the entire periphery of a portion on the radially inner side, of a portion of the shield 54 that is to the vehicle width direction outside of the fitting groove 56A. A ring member 58 is housed in this ring groove 56B. The ring member 58 urges the ring groove 56B toward the radially outer side of the shield 54. As a result, the open end portion on the vehicle width direction outside of the shield 54 is retained at the open end of the fuel filler opening 14 of the side member outer panel 12.

An abutting portion 66 that elastically abuts against an outer peripheral surface of the inlet pipe 50 is formed on an open end portion on the vehicle width direction inside of the shield 54. This abutting portion 66 is arranged in a space inside the rear wheel house 20.

Also, a flanged portion 60 that is arranged in the space inside the rear wheel house 20 and protrudes toward the radially outer side of the shield 54 is formed on the shield 54. As shown in the partial enlarged view of FIG. 2, the flanged portion 60 is arranged adjacent to the vehicle width direction inside of an overlapping portion 70 of the reinforcing member 40 and the wheel house outer panel 30. A bulging portion 60A that bulges out toward the vehicle width direction outside is formed on a protruding tip end portion of the flanged portion 60. This bulging portion 60A of the flanged portion 60 elastically abuts against the surface on the vehicle width direction inside of the overlapping portion 70 of the reinforcing member 40 and the wheel house outer panel 30, along the entire periphery.

Also, a ring groove 60B is formed along the entire periphery of a portion on the radially inner side of the shield 54. A ring member 64 that serves as an urging member is housed in this ring groove 60B. This ring member 64 urges the flanged portion 60 toward the radially outer side of the shield 54.

Also, an engaging portion 62 that is arranged adjacent to, to the vehicle width direction outside of, the bent end portion 44 of the reinforcing member 40 is formed on the shield 54. This engaging portion 62 protrudes out from a radially outer side surface of the shield 54 and is formed along the entire periphery of the shield 54. This engaging portion 62 engages with a tip end of the bent end portion 44 of the reinforcing member 40.

(Operation and Effects)

Next, the operation and effects of the example embodiment will be described.

As shown in FIG. 2, the plate-shaped reinforcing member 40 is joined to the outer peripheral portion of the first through-hole 34X of the wheel house outer panel 30, and this reinforcing member 40 has the second through-hole 40X formed in a position overlapping with the first through-hole 34X of the wheel house outer panel 30. Therefore, the surrounding portion of the first through-hole 34X of the wheel house outer panel 30 is reinforced by the reinforcing member 40. Further, the bent end portion 44 that is formed bent is provided along the entire periphery of the peripheral edge portion of the second through-hole 40X of the reinforcing member 40. As a result, the rigidity of the peripheral edge portion of the second through-hole 40X of the reinforcing member 40 is able to be increased. Therefore, even if a load is input to the surrounding portion of the first through-hole 34X of the wheel house outer panel 30 that is reinforced by the reinforcing member 40, the surrounding portion of the first through-hole 34X of the wheel house outer panel 30 will not easily deform.

Also, the reinforcing flange portion 46 that is formed bent is provided along the entire periphery of the outer peripheral portion of the reinforcing member 40, so the surface rigidity of the reinforcing member 40 is increased. That is, even if a load in a direction along the through-direction of the second through-hole 40X (i.e., the direction indicated by arrow X) is input to the reinforcing member 40, the reinforcing member 40 will not easily deform. Therefore, the surface rigidity of the surrounding portion of the first through-hole 34X of the wheel house outer panel 30 is able to be increased even more.

Also, the reinforcing flange portion 46 extends from the outer peripheral end of the reinforcing main body 42 via the second curved portion 48 that is curved toward the side opposite the side with the wheel house outer panel 30, and a portion (an upper end portion) in the circumferential direction of the second curved portion 48 of the reinforcing member 40 is arranged adjacent to the first curved portion 36 of the wheel house outer panel 30. Therefore, if a load is input to the reinforcing member 40 from the vehicle width direction outside, the load is able to be transmitted from the portion (the upper end portion) in the circumferential direction of the second curved portion 48 of the reinforcing member 40 to the first curved portion 36 of the wheel house outer panel 30. Also, the first curved portion 36 is more rigid than the upper end side wall 34B with respect to a load from the vehicle width direction outside, so the wheel house outer panel 30 will not deform as easily as when a load is transmitted from the entire periphery of the second curved portion 48 of the reinforcing member 40 to the upper end side wall 34B of the wheel house outer panel 30, for example.

As described above, with the inlet pipe peripheral structure according to this example embodiment, deformation of the surrounding portion of the first through-hole 34X of the wheel house outer panel 30 is able to be suppressed even if the inlet pipe 50 interferes with the surrounding portion of the first through-hole 34X of the wheel house outer panel 30 when the inlet pipe 50 is being assembled. As a result, deformation or offsetting of the shield 54 is able to be suppressed, so water leakage due to a seal defect of the shield 54 is able to be prevented or effectively inhibited.

Also, in this example embodiment, the engaging portion 62 that forms a portion of the shield 54 is engaged with the tip end of the bent end portion 44. Therefore, even if the bent end portion 44 is formed on the reinforcing member 40, the shield 54 is able to be stably retained on the peripheral edge portion side of the first through-hole 34X and the second through-hole 40X, thereby enabling sealability by the shield 54 to be improved, by a simple structure.

Second Example Embodiment

Figure 4A:
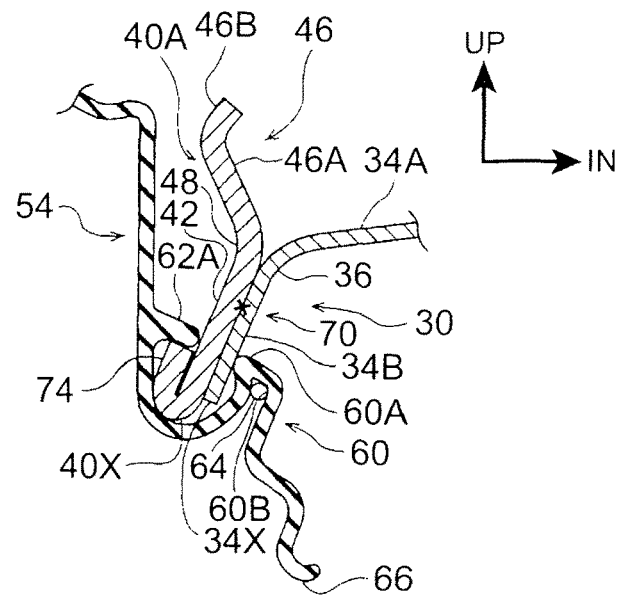
FIG. 4A is a sectional view of main portions of an inlet pipe peripheral structure according to a second example embodiment of the invention.

Next, an inlet pipe peripheral structure according to a second example embodiment of the invention will be described with reference to FIG. 4A. FIG. 4A is a sectional view of the main portions of the inlet pipe peripheral structure according to this example embodiment (i.e., FIG. 4A is a view corresponding to the partial enlarged view in FIG. 2 of the first example embodiment). This example embodiment has the same structure as the first example embodiment, except for the points described below. Therefore, components in this example embodiment that are similar to components in the first example embodiment will be denoted by the same reference characters in FIG. 4A, and descriptions of these components will be omitted.

As shown in FIG. 4A, a bent back end portion 74 that serves as a bent end portion is formed bent toward the vehicle width direction outside, instead of the bent end portion 44 in the first example embodiment (see FIG. 2), along the entire periphery of the peripheral edge portion of the second through-hole 40X of a reinforcing member 40A. This bent back end portion 74 is bent back toward the side with the reinforcing main body 42, and overlaps with the reinforcing main body 42. The other structure of the reinforcing member 40A is similar to the structure of the reinforcing member 40 in the first example embodiment (see FIG. 2).

Also, an engaging portion 62A that forms a portion of the shield 54 is engaged with a tip end of the bent back end portion 74 of the reinforcing member 40A. The structure of this engaging portion 62A is essentially the same as the structure of the engaging portion 62 in the first example embodiment, except for that the object with which it is engaged is different.

Similar operation and effects as those of the first example embodiment described above are also able to be obtained by the structure according to this example embodiment described above.

Third Example Embodiment

Figure 4B:
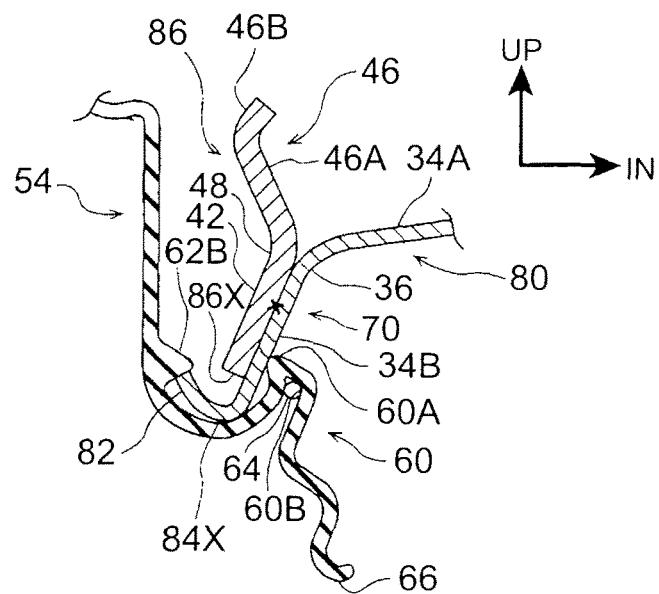
FIG. 4B is a sectional view of main portions of an inlet pipe peripheral structure according to a third example embodiment of the invention.

Next, an inlet pipe peripheral structure according to a third example embodiment of the invention will be described with reference to FIG. 4B. FIG. 4B is a sectional view of the main portions of the inlet pipe peripheral structure according to this example embodiment (i.e., FIG. 4B is a view corresponding to the partial enlarged view in FIG. 2 of the first example embodiment).

As shown in the drawing, the inlet pipe peripheral structure of this example embodiment differs from the inlet pipe peripheral structure according to the first example embodiment in that a bent end portion 82 is formed on a wheel house outer panel 80, instead of the bent end portion 44 in the first example embodiment (see FIG. 2).

That is, the structure of the wheel house outer panel 80 shown in FIG. 4B is substantially the same as the structure of the wheel house outer panel 30 in the first example embodiment (see FIG. 2), except that the bent end portion 82 is formed. Also, the structure of a reinforcing member 86 is substantially the same as the structure of the reinforcing member 40 in the first example embodiment (see FIG. 2), except that the bent end portion 44 in the first example embodiment (see FIG. 2) is not formed. Therefore, components in this example embodiment that are substantially the same as components in the first example embodiment will be denoted by like reference characters, and descriptions of these components will be omitted.

A first through-hole 84X for inserting the inlet pipe 50 (see FIG. 2) is formed in the upper end side wall 34B of the wheel house outer panel 80. The reinforcing member 86 has a second through-hole 86X for inserting the inlet pipe 50 (see FIG. 2) formed in a position overlapping with the first through-hole 84X. The second through-hole 86X of the reinforcing member 86 is arranged coaxially with the first through-hole 84X of the wheel house outer panel 80, and is set to have a slightly larger diameter than the diameter of the first through-hole 84X of the wheel house outer panel 80.

The bent end portion 82 that is formed bent toward the vehicle width direction outside is provided along the entire periphery of a peripheral edge portion of the first through-hole 84X of the wheel house outer panel 80. This bent end portion 82 is formed in a generally circular shape (a generally burring shape) by a bending process including burring, and in this example embodiment, the bent end portion 82 is inclined in a direction in which it becomes larger in diameter toward an extending tip end side, and opposing surfaces are symmetrically inclined.

Also, an engaging portion 62B that forms a portion of the shield 54 engages with a tip end of the bent end portion 82 of the wheel house outer panel 80. The structure of this engaging portion 62B is substantially the same as the structure of the engaging portion 62 in the first example embodiment, except for that the object with which it is engaged is different.

Similar operation and effects as those of the first example embodiment described above are also able to be obtained by the structure according to this example embodiment. Also, in this example embodiment, both the bulging portion 60A of the flanged portion 60 and the engaging portion 62B abut against the wheel house outer panel 80, so even if there is variation in the relative positions of the wheel house outer panel 80 and the reinforcing member 86, such variation will not affect the sealability. That is, in this example embodiment, sealability is even easier to ensure.

Supplemental Description of the Example Embodiments

As a modified example of the example embodiments described above, the reinforcing member may be arranged to the vehicle width direction inside of the wheel house outer panel. Also, the bent end portion that is formed along the entire periphery of the peripheral edge portion of at least one of the second through-hole of the reinforcing member and the first through-hole of the wheel house outer panel may be formed bent toward the vehicle width direction inside. Also, the bent end portion that is formed bent along the entire periphery of the peripheral edge portion of at least one of the second through-hole of the reinforcing member and the first through-hole of the wheel house outer panel may be formed bent at an obtuse angle, a right angle, or an acute angle (such as in the first and third example embodiments), or may be formed bent back as in the second example embodiment.

Also, as a modified example of the example embodiments described above, the bent end portion that is formed bent along the entire periphery of the peripheral edge portion of one of the second through-hole of the reinforcing member and the first through-hole of the wheel house outer panel may be formed bent back, and the other peripheral edge portion of either the second through-hole of the reinforcing member or the first through-hole of the wheel house outer panel may be tucked into the bent end portion (i.e., so-called hemming). Also, as another modified example, a bent end portion that is formed bent along the entire periphery of the peripheral edge portion of both the second through-hole of the reinforcing member and the first through-hole of the wheel house outer panel may be provided.

Also, in the example embodiments described above, the reinforcing flange portion 46 of the reinforcing member 40, 40A, and 86 shown in FIGS. 2 to 4 is formed by the inclined flange 46A and the flat plate flange 46B, but the reinforcing flange portion may also be formed with only a portion corresponding to the inclined flange 46A. Also, the reinforcing flange portion may be a cylindrical flange portion, or may be a flange portion that becomes smaller in diameter toward the extending tip end side. Further, as another modified example of the example embodiments described above, the reinforcing flange, portion does not have to be formed along the entire periphery of the outer peripheral portion of the reinforcing member.

Also, as a modified example of the example embodiments described above, a concave portion that is indented to the side opposite the wheel house outer panel may be formed along the entire periphery of the outer periphery of the second through-hole in the reinforcing main body of the reinforcing member (i.e., in a portion corresponding to the reinforcing main body 42 in the example embodiment described above), and a closed section may be formed by the reinforcing main body and the wheel house outer panel. Also, as another modified example, the outer shape of the reinforcing member may be set in an ellipsoid shape that is long in the vehicle front-rear direction in a vehicle side view.

Further, as a modified example of the example embodiments described above, the entire periphery of the second curved portion 48 of the reinforcing member 40, 40A, and 86 may be arranged adjacent to the upper end side wall 34B of the wheel house outer panel 30 and 80.

Also, as a modified example of the example embodiments described above, an engaging portion that engages with the outer peripheral end of the reinforcing member, or with a special tab portion that is partially cut out and bent up from the reinforcing member or the like, for example, may be set instead of the engaging portion 62, 62A, and 62B, on the cylindrical shield that surrounds a portion of the inlet pipe 50.

Also, when the bent end portion is formed bent toward the vehicle width direction outside along the entire periphery of the peripheral edge portion of both the second through-hole of the reinforcing member and the first through-hole of the wheel house outer panel, an engaging portion that forms a portion of the shield may be engaged with a tip end of these bent end portions (i.e., the two bent end portions).

The foregoing example embodiments and the plurality of modified examples described above may be carried out in any suitable combination.

While one example of the invention has been described, the invention is not limited to this example, and may of course also be modified without departing from the scope thereof.

The invention claimed is:

1. An inlet pipe peripheral structure comprising:
   a wheel house outer panel including a main body portion which comprises an upper end side wall provided on an upper end portion thereof, and a first through-hole for inlet pipe insertion formed in the upper end side wall;
   a plate-shaped reinforcing member that is joined to an outer peripheral portion of the first through-hole of the wheel house outer panel, and in which a second through-hole for inlet pipe insertion is formed in a position overlapping with the first through-hole; and
   a bent end portion that is formed bent along an entire periphery of a peripheral edge portion of at least one of the second through-hole of the plate-shaped reinforcing member and the first through-hole of the wheel house outer panel,
   wherein the plate-shaped reinforcing member includes a reinforcing main body that forms an outer peripheral portion of the second through-hole and that is in surface contact with the upper end side wall and joined to the upper end side wall by spot welding,
   wherein a reinforcing flange portion that is formed bent is provided along an entire periphery of an outer peripheral portion of the plate-shaped reinforcing member,
   wherein the wheel house outer panel includes a first curved portion that is curved toward a vehicle width direction inside from the upper end side wall toward an upper end edge portion, and
   wherein the plate-shaped reinforcing member is arranged to a vehicle width direction outside of the wheel house outer panel, the reinforcing flange portion of the plate-shaped reinforcing member extending from an outer peripheral end of the reinforcing main body via a second curved portion that is curved to a side opposite a side with the wheel house outer panel, and a portion in a circumferential direction of the second curved portion of the plate-shaped reinforcing member being arranged adjacent to the first curved portion of the wheel house outer panel.

2. The inlet pipe peripheral structure according to claim 1, wherein a bent end portion that is formed bent toward a vehicle width direction outside is provided along the entire periphery of the peripheral edge portion of the second through-hole of the plate-shaped reinforcing member.

3. The inlet pipe peripheral structure according claim 1, wherein
   a bent back end portion that serves as a bent end portion is formed bent toward a vehicle width direction outside along the entire periphery of the peripheral edge portion of the second through-hole of the plate-shaped reinforcing member, and the bent back end portion is bent back toward a side with the reinforcing main body and overlaps with the reinforcing main body.

4. The inlet pipe peripheral structure according to claim 1, wherein
   a bent end portion that is formed bent toward a vehicle width direction outside is provided on the entire periphery of the peripheral edge portion of the first through-hole of the wheel house outer panel.

5. The inlet pipe peripheral structure according to claim 1, wherein
   a cylindrical shield that is inserted through both the first through-hole and the second through-hole, and that surrounds a portion of an inlet pipe is arranged;
   an engaging portion is formed on the shield and protrudes from the shield; and
   the engaging portion engages with a tip end of the bent end portion.

6. An inlet pipe peripheral structure comprising:
   a wheel house outer panel including a main body portion which comprises an upper end side wall provided on an upper end portion thereof, and a first through-hole for inlet pipe insertion formed in the upper end side wall;
   a plate-shaped reinforcing member that is joined to an outer peripheral portion of the first through-hole of the wheel house outer panel, and in which a second through-hole for inlet pipe insertion is formed in a position overlapping with the first through-hole; and
   a bent end portion that is formed bent along an entire periphery of a peripheral edge portion of at least one of the second through-hole of the plate-shaped reinforcing member and the first through-hole of the wheel house outer panel,
   wherein the plate-shaped reinforcing member includes a reinforcing main body that forms an outer peripheral portion of the second through-hole and that is in surface contact with the upper end side wall and joined to the upper end side wall by spot welding,
   a cylindrical shield that is inserted through both the first through-hole and the second through-hole, and that surrounds a portion of an inlet pipe is arranged;
   a flanged portion that protrudes toward a radially outer side of the shield and abuts along an entire periphery against a surface on a vehicle width direction inside of an overlapping portion of the plate-shaped reinforcing member and the wheel house outer panel is formed on the shield, and an urging member that urges the flanged portion toward the radially outer side of the shield is provided on the shield;
   the bent end portion is formed bent toward a vehicle width direction outside along the entire periphery of at least one of the peripheral edge portions; and an engaging portion that forms a portion of the shield is engaged with a tip end of the bent end portion.

* * * * *